United States Patent [19]

Maekawa et al.

[11] 4,100,120

[45] Jul. 11, 1978

[54] RESINOUS COMPOSITION

[75] Inventors: Iwao Maekawa; Isao Uchigasaki; Sakato Kumazaki, all of Hitachi, Japan

[73] Assignee: Hitachi Chemical Company, Ltd., Japan

[21] Appl. No.: 773,332

[22] Filed: Mar. 1, 1977

[30] Foreign Application Priority Data

Mar. 2, 1976 [JP] Japan ................ 51-22874

[51] Int. Cl.² ............................................. C09D 3/68
[52] U.S. Cl. ............................. 260/22 CB; 260/23 P
[58] Field of Search ............... 260/22 CB, 861, 75 A, 260/22 R, 23 P

[56] References Cited

U.S. PATENT DOCUMENTS

| | | | |
|---|---|---|---|
| 2,444,263 | 6/1948 | Lane et al. ................ | 260/22 CB |
| 2,452,992 | 11/1948 | Butler ........................ | 260/22 CB |
| 2,467,958 | 4/1949 | Bloch ........................ | 260/22 CB |
| 2,671,070 | 3/1954 | Knapp ....................... | 260/75 A |
| 3,088,927 | 5/1963 | Dissen ....................... | 260/22 CB |
| 3,347,806 | 10/1967 | Zimmermann .............. | 260/22 CB |
| 3,448,066 | 6/1969 | Parker ........................ | 260/22 R |
| 3,933,757 | 1/1976 | Pratt et al. .................. | 260/75 A |
| 3,965,059 | 6/1976 | Kerridge et al. ............. | 260/22 CB |
| 4,014,830 | 3/1977 | Rumfield .................... | 260/22 CB |

FOREIGN PATENT DOCUMENTS 585,496  2/1947  United Kingdom ............ 260/22 CB

*Primary Examiner*—Ronald W. Griffin
*Attorney, Agent, or Firm*—Craig & Antonelli

[57] ABSTRACT

A resinous composition comprising (1) 40 – 90 parts by weight of one or more oligomers obtained by reacting a polyvalent alcohol or its derivative with a fatty acid derived from oils and fats, and a monobasic acid of the formula,

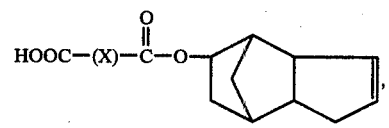

wherein X is an α,β-unsaturated hydrocarbon group having 2 or 3 carbon atoms, and (2) 10 – 60 parts by weight of one or more polymerizable monomers having at least one polymerizable double bond in the molecule, is particularly suitable for use in coating, and casting for electric insulation. The resinous composition can be used in solventless and can prevent bad odor of styrene. Coating films obtained from the resinous composition are excellent in resistance to blocking, resistance to solvents, resistance to stains, hardness, gloss, flexibility and the like.

16 Claims, No Drawings

RESINOUS COMPOSITION

This invention relates to a hardenable resinous composition, more particularly, this invention relates to a resinous composition having high solid content suitable for use in coating, casting for electric insulation, and the like with excellent properties.

Unsaturated polyester resins which use maleic anhydride, fumaric acid, saturated polybasic acids, polyvalent alcohols, styrene monomer, and the like as essential raw materials have developed remarkably mostly in fiber-reinforced plastics (FRP), since the unsaturated polyester resins have been not only well balanced in cost and physical properties, but also excellent in handling as a solventless thermosetting resin. But when the unsaturated polyester resins were used for coating smooth surfaces such as metal surfaces, they had such defects as poor flexibility, poor adhesion to the smooth surfaces of metals, plastics and the like. Therefore, amino-alkyd resins and acrylic resins have been used mainly for that purpose in place of the unsaturated polyester resins.

On the other hand, saving resources and environmental pollution have recently become one of most important problems, which require great reconversion of synthetic resin industries. For example, amino-alkyd resins and acrylic resins, which have been used for coating metals as mentioned above, are mainly used as a solvent type resin, in which a large amount of solvent becomes useless after the formation of coating film. Urethane resins used for wood-working, which are socalled D,D-lacquer, are also solvent type resins. These resins are in a very disadvantageous position socially and economically from viewpoints of saving resources and environmental pollution. That is, in order to increase the solid content and to reduce the amount of solvent in the amino-alkyd resins and acrylic resins, it is necessary to lower the molecular weights of the resins, but the lowering of the molecular weight should naturally be restricted considering a balance between the molecular weight and physical properties of the coating film. So that maximum solid content is, at present, about 70 - 80% by weight in case of the amino-alkyd resins and about 60 - 70% by weight in case of the acrylic resins.

In place of these resins, there are spotlighted as paints and varnishes for saving resources and free from environmental pollution water-soluble resins, powdered paints, and unsaturated polyester resins as a solventless type resin.

But these also have various problems. Since the water-soluble resins use water in a large proportion, they are advantageous in air pollution but properties of the coating film obtained therefrom are generally greatly inferior to those of solvent type amino-alkyd resins and acrylic resins. The water-soluble resins are also disadvantageous in water pollution. The powdered paints have problems not only in dust, bad odor during stoving time for curing, costs and coating techniques but also in the requirement of great change in a coating apparatus, which is the greatest defect. The unsaturated polyester resins, which are used predominantly in the field of wood-working like D,D-lacquer, have defects in flexibility of the coating film, adhesion to metal surfaces, drying rate on the surface, odor of styrene, and the like, so that they are not generally used for metal coating, although they are considerably advantageous in saving resources and environmental pollution.

Further, in casting processes, epoxy resins have been used predominantly, but the use of a large amount of solvents as the coating for metals does and the use of poisonous amine curing agents have provided various problems. In addition, flying away of styrene monomer during molding processes has recently been controlled legally from viewpoints of environmental safety and improvement of working environment.

Under such circumstances, the present inventors have earnestly studied to overcome the defects of unsaturated polyester resins and found that a special composition can reduce the amount of styrene flying away to half comparing with conventional unsaturated polyester resins if styrene monomer is used, and accomplished the present invention.

The present invention provides a resinous composition comprising (1) 40 - 90 parts by weight of one or more oligomers obtained by reacting a polyvalent alcohol or its derivative with a fatty acid derived from oils and fats in an amount of 30 - 70% by mole based on the hydroxyl group of the polyvalent alcohol and a monobasic acid of the formula,

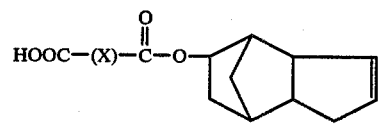

wherein X is an $\alpha,\beta$-unsaturated hydrocarbon group having 2 or 3 carbon atoms, in an amount of 30 - 70% by mole based on the hydroxyl group of the polyvalent alcohol, and (2) 10 - 60 parts by weight of one or more polymerizable monomers having at least one polymerizable double bond in the molecule. This resinous composition is suitable for use in coating, and casting for electric insulation.

As the polyvalent alcohol, there may be used compounds having two or more alcoholic hydroxyl groups in the molecule such as bivalent alcohols, trivalent alcohols and the like. Examples of the polyvalent alcohols are ethylene glycol, diethylene glycol, propylene glycol, dipropylene glycol, butylene glycol, neopentyl glycol, 1,3-butanediol, 1,4-butanediol, trimethylolpropane, trimethylolethane, glycerin, pentaerythritol, and the like.

As the polyvalent alcohol derivatives, there may be used polyvalent alcohols having ester bonds, ether bonds, urethane bonds, and the like in the molecule, for example, polyester obtained by reacting n moles of a dibasic acid with ($n + 1$) moles of a polyvalent alcohol, polyether polyols obtained by ring opening alkylene oxides, and polyurethane polyols obtained by reacting $n$ moles of a diisocyanate with ($n + 1$) moles of a polyvalent alcohol.

It is preferable to use a polyvalent alcohol or its derivative having a molecular weight of 500 or less. If the molecular weight is higher than 500, it is very difficult to make the resinous composition containing pigments, fillers, and the like solventless or having extremely high solid. It is also preferable to use adipic acid ethylene glycol diester as the polyvalent alcohol derivative.

As the monobasic acid of the formula,

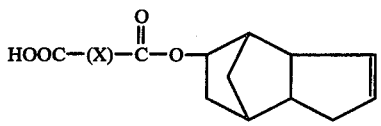

wherein X is as defined above, there may be used compounds obtained by esterification or addition reaction of dicyclopentadiene or hydroxylated dicyclopentadiene with an α,β-unsaturated dicarboxylic acid or anhydride such as maleic anhydride, fumaric acid, itaconic acid, citraconic acid or the like using a known process in the absence of a catalyst or in the presence of, if necessary, an acid catalyst such as a conventional Lewis acid.

The monobasic acid is used in an amount of 30 – 70% by mole based on the hydroxyl group of the polyvalent alcohol. If the amount of monobasic acid is less than 30% by mole, the resulting coating film obtained by curing the resinous composition is poor in adhesion to metals and hardness, while if more than 70% by mole, the resulting coating film loses flexibility and becomes brittle due to high crosslinking density.

The monobasic acid can also be obtained by using waste fluid containing maleic acid as follows. The waste fluid containing maleic acid can be obtained by absorbing in water waste gas containing maleic acid produced in industrial production of maleic anhydride, phthalic anhydride, and the like. The waste fluid is preferably used after having been concentrated, concentration of maleic acid being preferably 40% by weight or more. Substantially chemically equivalent amount of dicyclopentadiene is reacted with the maleic acid in the waste fluid using a solvent which can form an azeotropic mixture with water and has a lower boiling point than the decomposition temperature of dicyclopentadiene, e.g., toluene, xylene, benzene, diisobutylene, and the like, at a temperature lower than the decomposition temperature of dicyclopentadiene, preferably at 100° – 140° C, under reflux, while distilling the water azeotropically, for e.g. about 3 hours. The solvent is used for removing excess water in the waste fluid containing maleic acid by azeotropic distillation smoothly.

As the fatty acid derived from oils and fats, there may be used fatty acids derived from linseed oil, tung oil, safflower oil, dehydrated castor oil, cottonseed oil, soybean oil, rice bran oil, tall oil, coconut oil and the like.

The fatty acid is used in an amount of 30 – 70% by mole based on the hydroxyl group of the polyvalent alcohol. If the amount of the fatty acid is less than 30% by mole, the resulting coating film obtained by curing the resinous composition is poor in flexibility and brittle, as well as poor in smoothness and dispersibility of pigments. If the amount of the fatty acid is more than 70% by mole, the resulting coating film becomes too soft to use practically and tends to change yellow easily.

The oligomer can be obtained by reacting the polyvalent alcohol or its derivative with the fatty acid derived from oils and fats and the monobasic acid using a conventional condensation method such as a melting method and a solvent method (using xylene or toluene) under the reaction conditions usually used for preparing unsaturated polyesters and alkyd resins, if necessary, in the presence of a conventional catalyst, while controlling acid value. The acid value is not limited but it is necessary to continue the reaction until the oligomer becomes transparent at room temperature.

One or more oligomer thus obtained are used for obtaining the resinous composition of the present invention. The amount of the oligomer in the resinous composition is 40 to 90 parts by weight per 100 parts by weight of the resinous composition. If the oligomer is less than 40 parts by weight, excellent features of the oligomer cannot be used effectively due to the remaining unreacted polymerizable monomer in the coating film.

On the contrary, if the oligomer is more than 90 parts by weight, it is difficult to form a coating film due to insufficient curing resulting from insufficient crosslinking, since polymerizable double bonds are retained in the oligomer.

Another component of the resinous composition of the present invention is the polymerizable monomer having at least one polymerizable double bond in the molecule such as aromatic vinyl compounds, acrylates of polyvalent alcohols, methacrylates of polyvalent alcohols, aromatic allyl compounds, and the like.

Examples of the polymerizable monomers are styrene, divinylbenzene, vinyltoluene, lauryl acrylate, lauryl methacrylate, methyl acrylate, methyl methacrylate, ethyl acrylate, ethyl methacrylate, carbitol acrylate, carbitol methacrylate, diallyl phthalate, triallyl cyanurate; diacrylates of ethylene glycol, diethylene glycol, polyethylene glycol, propylene glycol, dipropylene glycol, 1,4-butylenediol, 1,3-butanediol, 1,4-butanediol, 1,6-hexanediol, and neopentyl glycol; dimethacrylates of ethylene glycol, diethylene glycol, polyethylene glycol, propylene glycol, dipropylene glycol, 1,4-butylenediol, 1,3-butanediol, 1,4-butanediol, 1,6-hexanediol, and neopentyl glycol; triacrylates of trimethylolpropane, trimethylolethane, pentaerythritol, and glycerin; trimethacrylates of trimethylolpropane, trimethylolethane, pentaerythritol, and glycerin; and the like.

It is preferable to use the polymerizable monomers having boiling points of 200° C or more in the resinous composition used for coating, or casting for insulation in order to prevent volatility and to make high temperature stoving possible.

The polymerizable monomer may be used alone or two or more polymerizable monomers may be used in the resinous composition depending on a curing method, workability, processability, a coating method, and the like.

The amount of the polymerizable monomer in the resinous composition is 10 to 60 parts by weight per 100 parts by weight of the resinous composition. If the polymerizable monomer is less than 10 parts by weight, insufficient hardening is obtained due to insufficient crosslinking with the oligomer. If the polymerizable monomer is more than 60 parts by weight, there is retained in the coating film unreacted polymerizable monomer, which produces homopolymer in the coating film to lower physical properties of the coating film.

The resinous composition of the present invention can be cured by conventional processes using peroxides, redox curing in which a peroxide is used in combination with a curing accelerator, ultraviolet rays, electron beams, far infrared rays and the like. If the resinous composition is cured by using ultraviolet rays, it is necessary to add a conventional photosensitizer to the resinous composition.

As the peroxides, there may be used benzoyl peroxide, methyl ethyl ketone peroxide, di-t-butyl peroxide, lauroyl peroxide, cumene hydroperoxide, t-butyl peroxide, and the like.

As the curing accelerators, there may be used metal soaps in which the metal is cobalt, copper, manganese, lead or the like, tertiary amines, $\beta$-diketones, and the like. There is no limitation to the use and the amount of the peroxides and the curing accelerators.

The resinous composition may further contain pigments, fillers, dyes, and the like.

Since the resinous composition uses the oligomer having a low molecular weight, it can be used without a solvent or, if used, with at most 10% by weight of a solvent, so that it produces almost no odor and it is effective for saving resources and preventing environmental pollution. Further, defects of coating films of the conventional coating composition are overcome and the coating film obtained by the resinous composition of the present invention is excellent in resistance to blocking, resistance to solvents, resistance to stains, touch, hardness, gloss, flexibility and the like. The resinous composition can be cured by using a conventional method such as curing at room temperature, a baking method, and the like. Since the resinous composition shows excellent properties as mentioned above, it can widely be used in various fields such as flooring, woodworking, metals, light electric equipments, and the like.

The present invention is explained in detail by the following Examples, which do not limit the scope of the present invention. In the following Examples, all the parts and percents are by weight unless otherwise specified.

EXAMPLE 1

In a 1-liter four-necked flask equipped with a stirrer, a thermometer, a condenser attaching a reflux pipe and a nitrogen introducing pipe, 147 parts of maleic anhydride, 27 parts of deionized water and 198 parts of dicyclopentadiene were placed and the reaction was carried out at 130° C under nitrogen stream for 4 hours to give slightly yellow wax of maleic acid dicyclopentadiene monoester having acid value of 226. Then 420 parts of soybean oil fatty acid commercially available, 134 parts of trimethylolpropane and 30 parts of xylene were added to the monoester obtained and the esterification was carried out using a solvent method at 210° C for 3 hours to give an oligomer having acid value of 15. The oligomer was cooled to 80° C and 170 parts of trimethylolpropane triacrylate and 0.6 part of hydroquinone were added thereto to give a resinous composition having Gardner-Holdt viscosity of K.

EXAMPLE 2

The process of Example 1 was repeated except for using 340 parts of diallyl phthalate in place of 170 parts of trimethylolpropane triacrylate to give a resinous composition having Gardner-Holdt viscosity of G.

EXAMPLE 3

The process of Example 1 was repeated except for using linseed oil fatty acid in place of soybean oil fatty acid to give a resinous composition having Gardner-Holdt viscosity of M.

EXAMPLE 4

In the same apparatus as used in Example 1, 98 parts of maleic anhydride and 124 parts of ethylene glycol were placed and the reaction was carried out at 210° C for 3 hours to give ethylene glycol diester of maleic acid having acid value of 5. To this, 248 parts of maleic acid dicyclopentadiene monoester obtained in Example 1, 280 parts of linseed oil fatty acid and 25 parts of xylene were added and the esterification was carried out using a solvent method at 210° C for 4 hours to give an oligomer having acid value of 15. The oligomer was cooled to 80° C and 125 parts of trimethylolpropane triacrylate and 0.6 parts of hydroquinone were added thereto to give a resinous composition having Gardner-Holdt viscosity of G.

Comparative Example 1

In the same apparatus as used in Example 1, 250 parts of maleic anhydride, 370 parts of phthalic anhydride, 60 parts of ethylene glycol, 320 parts of diethylene glycol and 140 parts of propylene glycol were placed and the esterification was carried out at 210° C in the same manner as in Example 1 to give an unsaturated polyester having acid value of 25. The unsaturated polyester was cooled to 80° C and 600 parts of styrene and 0.15 part of hydroquinone were added thereto to give a resinous composition having Gardner-Holdt viscosity of K.

Comparative Example 2

The process of Comparative Example 1 was repeated except for using 200 parts of trimethylolpropane triacrylate in place of 600 parts of styrene and using 0.6 part of hydroquinone in place of 0.15 part to give a resinous composition having Gardner-Holdt viscosity of $Z_2$.

Film Performance Test

To each composition obtained by Examples 1 – 4, Comparative Example 2 and amino-alkyd commercially available, titanium oxide (rutile type) was added so that concentration by weight of the pigment became 40%. Viscosity of each coating composition was adjusted to 20 to 25 seconds by a ford cup at 25° C using a mixture of isobutanol and xylene in the weight ratio of 20 : 80. The resulting coating composition was coated on bonderized steel plates one time with a bar coater #60 and baked at 140° C for 20 minutes. The results of various tests on the coating films are as shown in Table 1. In order to harden the resinous composition, 0.4% of cobalt naphthenate (6% solution of cobalt) and 2.0% of t-butyl peroxybenzoate based on the weight of resinous composition were used.

Table 1

|  | Example | | | | Comparative Example | |
| --- | --- | --- | --- | --- | --- | --- |
|  | 1 | 2 | 3 | 4 | 2 | FT 945 |
| Non-volatile components at coating time (%) | 90.5 | 92.1 | 90.1 | 92.6 | 62.8 | 71.9 |
| Pencil hardness | H | HB | 2H | F | 3H | H |
| Cross cut test | 100 | 100 | 100 | 100 | 0 | 100 |
|  | 100 | 100 | 100 | 100 | 100 | 100 |
| Gloss [1] | 91.2 | 88.5 | 92.5 | 85.1 | 70.2 | 87.9 |
| Erichsen test (mm) | 4.1 | 5.3 | 3.9 | 4.6 | 0.9 | 4.5 |
| Du Pont Impact value [2] | 30 | 40 | 30 | 40 | 10> | 30 |
| Cross cut test after 1 hour's boiling | 100 | 100 | 100 | 100 | 0 | 55 |
|  | 100 | 100 | 100 | 100 | 100 | 100 |

Note:
[1] 60° Gloss meter
[2] Diameter of the hole ½ inch, weight 500 g.
[3] A mixture of high solid type alkyd resin manufactured by Hitachi Chemical Co., Ltd. and melamine resin (ML 245) manufactured by Hitachi Chemical Co., Ltd. in solid resin weight ratio of alkyd/melamine = 7/3.

The resinous compositions of Examples 3 and 4, and Comparative Example 1 were coated on decorative papers and thin base wood plates in an amount of 250 g/m² and cured at 25° C. Film performance was tested and the results are as shown in Table 2. In order to harden the resinous compositions, 0.4% of cobalt naphthenate (6% solution of cobalt), 0.1% of dimethylaniline and 2.0% of methyl ethyl ketone peroxide, (a 60% solution of dimethyl phthalate) based on the weight of the resinous composition were used.

Table 2

|  | Thin base wood plate | | Decorative paper | |
|---|---|---|---|---|
|  | Non-tackiness*1) | | Pencil | | Flexi- |
|  | 1 hour | 3 hours | hardness*3) | Curl*4) | bility |
| Example 3 | O | ⊚ | HB – H | ⊚ | ⊚ |
| Example 4 | O | ⊚ | HB – H | ⊚ | ⊚ |
| Comparative Example 1*2) | X ⊚*5) | X ⊚*5) | below 6B H – 2H | — X | — X |

Note:
*1)Non-tackiness: 100 Grams of a weight is loaded on gauze folded in four and placed on the thin base wood plate for 1 minute, and traces after removing the weight and gauze are judged. ⊚. no traces, O . . . slight traces, X . . . clear traces.
*2)A composition is made by adding 0.8% based on the composition of a styrene solution of paraffine wax (m.p. 130° F) (paraffine wax content 10%) to the composition of Comparative Example 1.
*3)After allowed to stand at 25° C. for 24 hours, the surface is scratched with a pencil. Hardness of a pencil which does not make scratches is recorded.
*4)Curl after hardened is observed.⊚. . . no curl, X . . . complete curl. (— not tested.)
*5)Parts including resin in the base wood plate are not cured.

EXAMPLE 5

In a 2-liter four-necked flask equipped with a condenser, a nitrogen introducing pipe, a thermometer and a stirrer, 292 parts of adipic acid and 464 parts of diethylene glycol were placed and the reaction was carried out at 220° C under nitrogen stream for 5 hours to give a resinous material having acid value of 7.9 and being liquid at room temperature. To the resinous material, 744 parts of MD-1, and 280 parts of soybean oil fatty acid were added and the reaction was carried out at 210° C under nitrogen stream for 3 hours to give an oligomer having acid value of 19.1. The oligomer was dissolved in styrene containing 0.01% of hydroquinone to give a resinous composition containing 60% of oligomer.

MD-1 was prepared as follows.

In a 2-liter four-necked flask equipped with a condenser, a nitrogen introducing pipe, a thermometer, and a stirrer, 784 parts of maleic anhydride, 144 parts of water, and 1056 parts of dicyclopentadiene were placed and the reaction was carried out under nitrogen stream at 130° C for 3 hours to give light yellow wax of maleic acid dicyclopentadiene monoester (MD-1).

EXAMPLE 6

In a 2-liter four-necked flask equipped with a condenser, a nitrogen introducing pipe, a thermometer and a stirrer, 280 parts of trimethylolpropane, 840 parts of linseed oil fatty acid and 744 parts of MD-2 were placed and the reaction was carried out at 210° C udner nitrogen stream for 4 hours to give an oligomer having acid value of 23.4. The oligomer was dissolved in 1,6-hexanediol diacrylate containing 0.02% of hydroquinone to give a resinous composition containing 60% of oligomer.

MD-2 was prepared as follows.

In a 2-liter four-necked flask equipped with a condenser, a nitrogen introducing pipe, a thermometer and a stirrer, 784 parts of maleic anhydride, and 1200 parts of hydroxylated dicyclopentadiene (Cydecanol, product of Hitachi Chemical Co., Ltd.) were placed and the reaction was carried out under nitrogen stream at 140° C for 5 hours to give light yellow wax of maleic acid dicyclopentadiene monoester (MD-2).

Casting Test

To individual 100 parts of the resinous compositions of Examples 5 and 6, and Comparative Example 1, 0.5 part of 6% cobalt octenate and 1.0 part of methyl ethyl ketone peroxide were added and then in a sigma blade mixer the resulting mixture was kneaded with 200 parts of silica sand #5 and 50 parts of calcium carbonate to give a uniformly viscous mixture in a very short time. The viscous mixture was poured into an outer container made of iron with 50 mm wide, 70 mm long and 150 mm high, in which an insert (30 mm wide, 50 mm long and 100 mm high) made of iron has been placed in the middle of the container about 20 mm high from the bottom. The viscous mixture was allowed to stand in the container at 25° C for 24 hours to be hardened. Adhesion state of the cast materials was observed with the naked eye and generation of cracks on the cast materials and electrical properties of the resinous compositions were tested and the results are as shown in Table 3.

Table 3

|  | Example 5 | Example 6 | Comparative Example 1 |
|---|---|---|---|
| Adhesion state | Complete adhesion | Complete adhesion | Remarkable peeling |
| Generation of cracks | No | No | Yes |
| Cracks caused by repeat of hot and cold * | >10 cycles | >10 cycles | 1 cycle NG |
| Volume resistivity (Ω-cm) 23° C | 3.6 × 10¹⁴ | 6.1 × 10¹⁵ | 8.3 × 10¹⁵ |
| Dielectric constant (10 KHZ) | 5.1 | 5.2 | 4.8 |

Note) *One cycle of heating at 120° C for 2 hours and cooling at 0° C for 2 hours at repeated. NG means generation of cracks.

What is claimed is:
1. A resinous composition comprising
   1. 40 – 90 parts by weight of one or more oligomers obtained by reacting a polyvalent alcohol or its derivative with a fatty acid derived from oils and fats in an amount of 30 – 70% by mole based on the hydroxyl group of the polyvalent alcohol, and a monobasic acid of the formula,

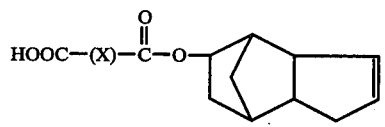

wherein X is an α,β-unsaturated hydrocarbon group having 2 or 3 carbon atoms in an amount of 70 – 30% by mole based on the hydroxyl group of the polyvalent alcohol, and
   2. 10 – 60 parts by weight of one or more polymerizable monomers having at least one polymerizable double bond in the molecule.
2. A resinous composition according to claim 1, wherein the polyvalent alcohol is a compound having two or more alcoholic hydroxyl groups in the molecule and having a molecular weight of 500 or less.
3. A resinous composition according to claim 1, wherein the polyvalent alcohol is a bivalent alcohol.
4. A resinous composition according to claim 1, wherein the polyvalent alcohol is a trivalent alcohol.
5. A resinous composition according to claim 1, wherein the polyvalent alcohol derivative is a polyester polyol.

6. A resinous composition according to claim 1, wherein the polyvalent alcohol derivative is a polyurethane polyol.

7. A resinous composition according to claim 1, wherein the fatty acid is soybean oil fatty acid.

8. A resinous composition according to claim 1, wherein the fatty acid is linseed oil fatty acid.

9. A resinous composition according to claim 1, wherein the monobasic acid is a reaction product of dicyclopentadiene and maleic anhydride prepared by reacting maleic anhydride with dicyclopentadiene at a temperature lower than the decomposition temperature of dicyclopentadiene.

10. A resinous composition according to claim 1, wherein the polymerizable monomer is mono-, di- or triacrylate or mono-, di- or trimethacrylate of polyvalent alcohol.

11. A resinous composition according to claim 1, wherein the polymerizable monomer is trimethylolpropane triacrylate.

12. A resinous composition according to claim 1, wherein the polymerizable monomer is styrene.

13. A resinous composition according to claim 1, wherein the polyvalent alcohol is trimethylolpropane, the fatty acid is soybean oil fatty acid, and the polymerizable monomer is 1,6-hexanediol diacrylate.

14. A resinous composition according to claim 1, wherein the polyvalent alcohol derivative is adipic acid ethylene glycol diester, the fatty acid is soybean oil fatty acid, and the polymerizable monomer is trimethylolpropane triacrylate.

15. A resinous composition according to claim 1, wherein the monobasic acid is prepared by reacting waste fluid containing maleic anhydride with dicyclopentadiene.

16. A resinous composition according to claim 1, wherein the monobasic acid is prepared by reacting waste fluid containing maleic acid with dicyclopentadiene azeotropical reflux at a temperature lower than the decomposition temperature of dicyclopentadiene.

* * * * *